United States Patent [19]

Ura et al.

[11] 4,128,437

[45] Dec. 5, 1978

[54] TRANSPARENTIZING AGENT FOR PAPER

[75] Inventors: Shigeru Ura, Toyonaka; Norio Kondo, Minoo; Yoshiya Fukuyama, Hirakata; Makoto Nakahara, Nishinomiya, all of Japan

[73] Assignee: Sumitomo Chemical Company, Limited, Osaka, Japan

[21] Appl. No.: 691,065

[22] Filed: May 28, 1976

Related U.S. Application Data

[62] Division of Ser. No. 527,382, Nov. 26, 1974, abandoned.

[30] Foreign Application Priority Data

Nov. 26, 1973 [JP] Japan ................................ 48/133177
Aug. 1, 1974 [JP] Japan ................................ 49/88713

[51] Int. Cl.[2] ................................ C09K 3/00

[52] U.S. Cl. ................................ 106/287.24; 106/287.25; 427/395; 428/481; 560/127

[58] Field of Search ................................ 260/29.2 E, 468 G; 428/481; 106/287 R, 287.24, 287.25; 560/127

[56] References Cited

U.S. PATENT DOCUMENTS

| | | | |
|---|---|---|---|
| 2,890,189 | 6/1959 | Greenlee | 260/292 |
| 3,182,041 | 5/1965 | Watkins, Jr. et al. | 428/481 |
| 3,310,512 | 3/1967 | Curtice | 260/29.2 E |
| 3,459,733 | 8/1969 | Byrd, Jr. et al. | 260/210 |
| 3,714,198 | 1/1973 | Metzger et al. | 260/348 A |
| 3,893,959 | 7/1975 | Layman | 260/29.2 E |

*Primary Examiner*—Lorenzo B. Hayes
*Attorney, Agent, or Firm*—Sughrue, Rothwell, Mion, Zinn and Macpeak

[57] ABSTRACT

A transparentizing composition for paper comprising a compound having the formula:

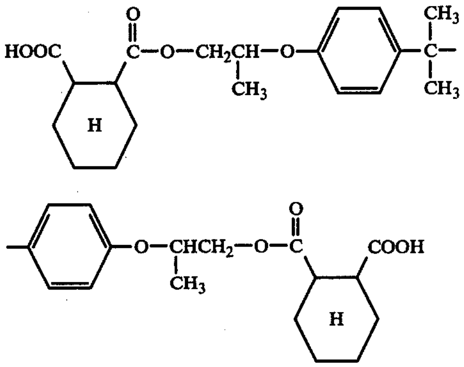

or salts thereof and a solvent.

3 Claims, No Drawings

TRANSPARENTIZING AGENT FOR PAPER

This is a division of application Ser. No. 527,382, filed Nov. 26, 1974, now abandoned.

BACKGROUND OF THE INVENTION

1. Field of the Invention

The present invention relates to a novel ester useful as a transparentizing agent for production of a transparent paper which is quite suitable as a copying paper and a tracing paper which are mainly used for copying, and further as a master paper which is used in well-known duplicating processes such as a diazo process, a silver salt process and electrophotography. The term "master paper" referred to herein means paper which is repeatedly used as an original for duplication.

2. Description of the Prior Art

Conventional, well-known methods for the preparation of transparent paper can be roughly divided into two methods as in the case of preparation of glassine paper; (1) a method comprising beating cellulosic fibers or passing the highly hydrated fibers under heat and pressure through a supercalender to remove any air bubbles from the paper web, whereby light scattering within the paper is reduced and thus the paper is transparentized, and (2) a method comprising impregnating a substance having an index of refraction approximately equal to that of cellulose, for example, dioctylphthalate, tricresylphosphate, polystyrol resins, styrenemaleic anhydride copolymers, alkyd resins and urea resins, into the paper web.

The former method, however, has the disadvantages that the method causes a reduction in the physical strengths of the paper, particularly the tearing strength, and the method causes a change in the dimension of the paper by humidity, that is, a reduction in the dimensional stability, because of the dense structure of paper, with frequent curling of paper.

Furthermore, in the latter method comprising impregnating a substance having an index of refraction similar to that of the fibers into the paper web, the properties of transparent paper obtained vary markedly depending on the kind of the substance, even if the both indices of refraction are similar to each other.

In general, when a substance which is a solid at room temperature is used, the transparent paper obtained is superior in its suitability for pencil-erasure and correction, and stiffness, but unfortunately is poor in its transparency and ink is easily repelled. On the other hand, when a substance which is a liquid at room temperature is used, the transparent paper obtained is superior in its transparency and ink-receptivity, but it is inferior in its suitability for pencil-erasure and correction, and in addition migration of the liquid substance and changes in the quality of the paper during storage occur.

For this reason, many attempts have been made to overcome these defects but satisfactory substances have not yet been found. Investigations on compounds free from the above-described defects which are suitable for the latter impregnation method have been made and it has now been found that the use of some particular esters among those which are obtained from an acid and an alcohol eliminates most of the above-described defects, thus imparting to papers good transparency, dimensional stability, stiffness, storage stability for a long period and suitability for writing, pencil-erasure, printing and correction.

SUMMARY OF THE INVENTION

An object of the present invention is to provide a novel ester useful as a transparentizing agent for paper.

Another object of the present invention is to provide a novel transparentizing composition for paper containing the novel ester.

Thus, the present invention provides an ester of the formula (I)

$$HOOC-R_1-\overset{O}{\overset{\|}{C}}-[O-R_3-O-\overset{O}{\overset{\|}{C}}-R_2-\overset{O}{\overset{\|}{C}}]_n-O-R_3-O-\overset{O}{\overset{\|}{C}}-R_2-COOH \quad (I)$$

wherein $R_1$ and $R_2$ each represents

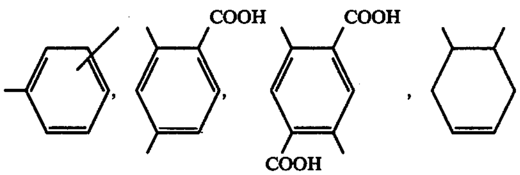
or

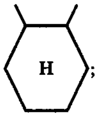
; $R_3$ is

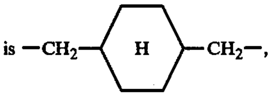
,

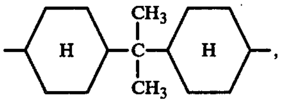
,

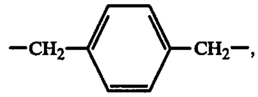
,

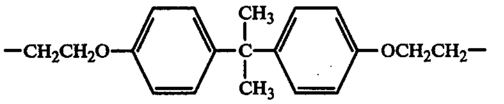
or

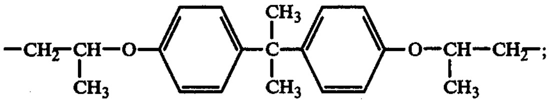
;

and n is zero or an integer of 1 to 3.

The invention also provides a transparentizing composition for paper containing at least one ester of the formula (I) or a neutralized product thereof and a solvent.

DETAILED DESCRIPTION OF THE INVENTION

The transparentizing composition of the present invention can further contain at least one other ester prepared from a polyhydric alcohol other than the cyclic polyhydric alcohol of the formula (II) hereinafter described and polycarboxylic acid other than the cyclic polycarboxylic acid of the formula (III) or (IV) hereinafter described.

The ester of the formula (I) can be prepared by reacting a cyclic polyhydric alcohol of the formula (II), $$HO - R_3 - OH \qquad (II)$$

wherein $R_3$ is as defined above, with a cyclic polycarboxylic acid, or acid anhydride thereof, of the formula (III) or (IV)

$$HOOC - R_1 - COOH \qquad (III)$$

or $$HOOC - R_2 - COOH \qquad (IV)$$

wherein $R_1$ and $R_2$ are as defined above, using conventional esterification methods.

The esterification can be effected using two or more cyclic polyhydric alcohols of the formula (II) (if desired, together with at least one polyhydric alcohol other than the cyclic polyhydric alcohol of the formula (II)), and two or more cyclic polycarboxylic acids of the formula (III) or (IV) (if desired, together with at least one polycarboxylic acid other than the cyclic polycarboxylic acid of the formula (III) or (IV)).

Examples of suitable cyclic polyhydric alcohols of the formula (II) which can be used in the present invention are hydrogenated bisphenol A, 1,4-bis-(hydroxymethyl)benzene, 1,4-bis-(hydroxymethyl)cyclohexane, 2,2'-di-(4-hydroxyethoxyphenyl)propane, 2,2'-di-(4-hydroxypropoxyphenyl)propane and the like. Suitable polyhydric alcohols other than the cyclic polyhydric alcohols of the formula (II) include ethylene glycol, propylene glycol, diethylene glycol, polyethylene glycol and the like.

Typical cyclic polycarboxylic acids of the formula (III) or (IV) which can be used in the present invention, are phthalic acid, tetrahydrophthalic acid, hexahydrophthalic acid, isophthalic acid, terephthalic acid, trimellitic acid, pyromellitic acid and the acid anhydrides thereof. Suitable polycarboxylic acids other than the cyclic polycarboxylic acids of the formula (III) or (IV) include maleic anhydride, fumaric acid, succinic, anhydride, succinic acid, adipic acid, itaconic acid and the like.

The reaction between the alcohol of the formula (II) and the acid of the formula (III) and (IV) can be easily performed under conventional esterification conditions. For example, the esterification reaction can be conducted at a temperature of about 80° to 200° C., preferably 120° to 180° C., for about 2 to 6 hours, using 1 mole of the alcohol of the formula (II) and 1.6 to 2 moles of the acid of the formula (III) and (IV). After the reaction is completed the reaction mixture can be cooled for solidification of the product. The solid obtained is pulverized and then formulated if desired after neutralization, into a transparentizing composition. Alternatively, the reaction mixture can be dissolved in a solvent to be used for the formulation, if desired after neutralization. The neutralization can be effected using ammonia, alkali metal hydroxides such as sodium hydroxide and potassium hydroxide or lower alkylamine compounds such as triethylamine, dimethylethanolamine and diethylethanolamine.

The thus obtained esters of the formula (I) have a number average molecular weight ($M_n$) of about 400 to 2500, preferably 400 to 1500, an acid value of about 45 to 280, preferably 150 to 200, and a softening point (measured by the ring and ball method) of about 40° to 100° C., preferably 70° to 100° C.

Of these esters of the formula (I), a preferred ester is an ester having the following formula (I')

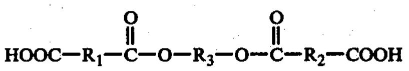 (I')

wherein $R_1$, $R_2$ and $R_3$ are as defined above.

In the esters of the formula (I'), a particularly preferred ester is an ester having the following formula,

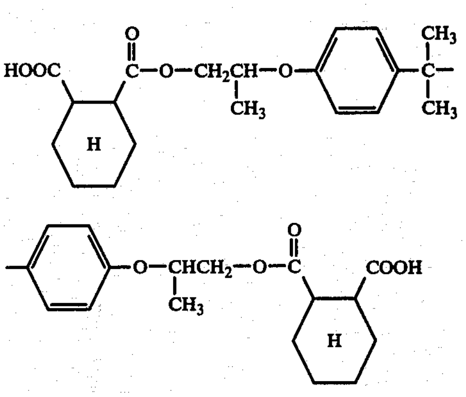

Typical examples of esters of the formula (I) obtained according to the process of the present invention are as follows.

| Compound | Formula | Physical Property: Acid Value | Physical Property: Softening Point (° C) | Physical Property: $\bar{M}n$ |
|---|---|---|---|---|
| 1 | 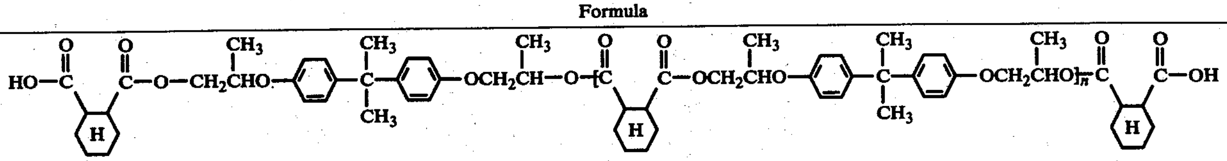 | 170 | 75 | 700 |
| 2 | 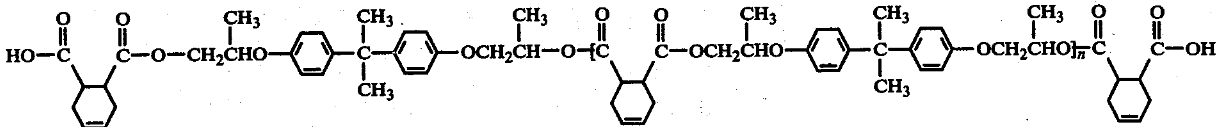 | 173 | 67 | 750 |
| 3 | 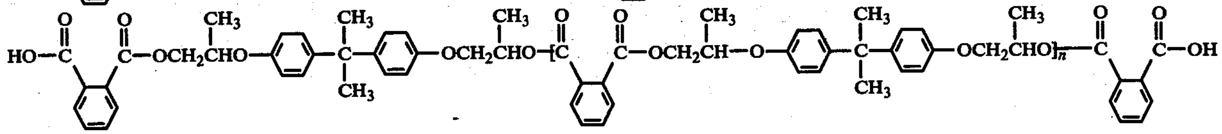 | 175 | 62 | 680 |
| 4 | 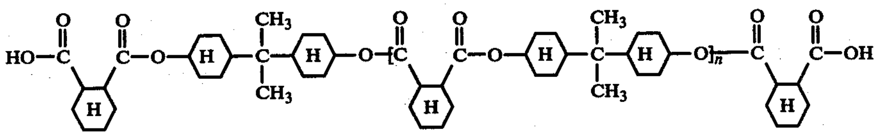 | 204 | 85 | 620 |
| 5 | 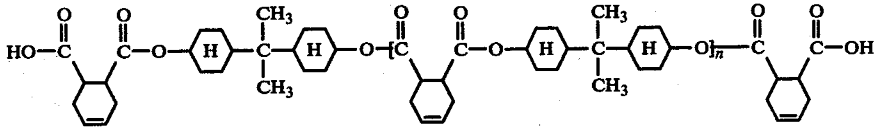 | 210 | 71 | 710 |
| 6 | 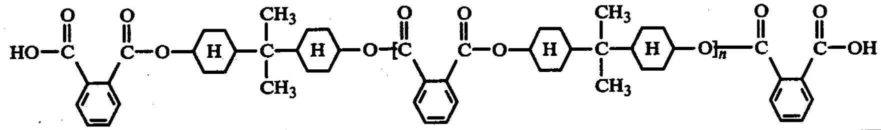 | 208 | 66 | 670 |
Note:
n is zero or an integer of 1 to 3.
$\bar{M}n$ means number average molecular weight.

To prepare the transparentizing composition of the present invention from the esters thus obtained, the esters can be dissolved in an organic solvent as they are, or the neutralized products thereof can be dissolved in water or an organic solvent alone or in a combination of water and an organic solvent. When a mixture of at least one ester of the formula (I) and at least one ester of an alcohol and acid which is not of the formula (I) is used for the preparation of the transparentizing composition, the ester of the formula (I) is used in an amount of about 50% by weight or more based on the weight of the ester mixture. When good transparentizing ability, suitability for sizing, and physical strength are particularly strongly required, the ester of the formula (I) is preferably used in an amount of more than 80% by weight.

The amount of the ester used for the formulation depends on requirements for the formulated transparentizing composition, for example, processability. In general, however, the ester is used in an amount of about 10 to 70% by weight based on the total weight of the ester and the solvent.

When the transparentizing agents are to be applied in paper making in the form of a solution in water alone, the use of esters having a molecular weight of less than 2000 is particularly preferred since improved penetration of the agents into the paper is obtained.

Further the organic solvent used in each formulation can be a mixture of two or more organic solvents, if desired.

Suitable organic solvents which can be used in the present invention include methanol, ethanol, isopropanol, acetone, toluene, ethylcellosolve and the like. The proportion in which these solvents are employed depends upon the use and manufacturing condition of transparent papers.

For the preparation of the present transparentizing compositions, a suitable amount of well-known nature or synthetic rubber adhesives can be added, if necessary, for the purpose of controlling the viscosity of the solution of the transparentizing composition and improving the quality of paper. Alternatively, a small amount of auxiliary agents such as plasticizers, penetrating agents, antistatic agents and colorants can be employed. Furthermore, the present transparentizing agents can also be formulated in combination with other transparentizing agents such as sucrose acetate isobutyrate, petroleum resins and paraffins. In addition, the present agents can be formulated in combination with amino resins for application to a curing method using acidic catalysts.

The transparentizing composition liquors thus obtained can be applied to the substrate using well-known coating or impregnation processes, and the substrate thoroughly impregnated is subjected to drying as usual, which means curing at about 80° to 120° C. for more than at least 30 seconds.

The transparent paper obtained with the transparentizing agents for paper according to the present invention has superior performance characteristics to those obtained with conventional transparentizing agents. Specifically, the transparent paper is superior in transparency, in suitability for impregnation, sizing and pencil-erasure, and in tensile strength, and furthermore migration of the agents to adjacent substances during storage does not occur.

The present invention will be illustrated in greater detail with reference to the following examples, which are only given for the purpose of illustration, and are not to be interpreted as limiting the invention.

The opacity of the transparent paper obtained was measured on a Hunter reflecto-meter according to JIS-P-8138, the tearing strength according to JIS-P-8116, and the sizing degree according to JIS-P-8122 (Stockigt method). All parts, percents, ratios and the like in the examples are by weight, unless otherwise indicated.

EXAMPLE 1

In a one liter four-necked flask equipped with a thermometer and condenser were placed 344 parts of 2,2'-di-14-hydroxypropoxyphenyl)propane and 308 parts of hexahydrophthalic anhydride, and the temperature was increased to 180° to 220° C. on a mantle heater, at which esterification was carried out for 3 hours while stirring.

The ester thus obtained, a solid at room temperature (about 20° to 30° C.), had an acid value of 170, and a number average molecular weight $M_n$ of 700 on a vapor pressure osmometer. The ester was neutralized with aqueous ammonia and diluted with the required amount of isopropyl alcohol to obtain a transparentizing composition liquor having a solid content of 30%.

Paper having a basis weight of about 80 g/m$^2$ and an opacity of 83% was impregnated with the liquor and the excess liquor was removed by squeezing the paper between two rubber rolls. The treated paper thus obtained was dried at 130° C. for 2 minutes and then tested. It was found from the test results that the transparent paper thus obtained had a transparentizing agent-content of 9.5% (referred to hereinafter as "agent-content"), an opacity of 41%, and a sizing degree of 92.4 seconds.

EXAMPLE 2

In the same manner as in Example 1, a mixture of 281 parts of hydrogenated bisphenol A and 237.4 parts of tetrahydrophthalic anhydride was kept at 180° to 220° C. for 3 hours while stirring. The ester thus obtained, a solid at room temperature, had an acid value of 116 and a number average molecular weight $M_n$ of 1260.

The ester was dissolved, without neutralization, in a 2:1 (by volume) mixture of isopropyl alcohol to toluene to obtain a transparentizing composition. The composition was applied in the same manner as described in Example 1 to produce a transparent paper having an agent-content of 8.7% and an opacity of 51.7%.

EXAMPLE 3

In the same manner as in Example 1, 129 parts of 1,4-bis-hydroxymethylcyclohexane, 10.4 parts of neopentyl glycol, 199.8 parts of phthalic anhydride and 21.9 parts of adipic acid were placed in a flask and the mixture was maintained at 160° to 200° C. for 3 hours while stirring. The ester thus obtained, a solid at room temperature, had an acid value of 174 and a number average molecular weight $M_n$ of 710.

The ester was neutralized with aqueous ammonia and dissolved in a 2:1 (by volume) mixture of isopropyl alcohol to toluene to obtain a transparentizing composition.

The composition was applied in the same manner as described in Example 1 to produce a transparent paper having an agent-content of 10.8% and an opacity of 54%. The paper was superior in physical properties such as sizeability and tearing strength.

EXAMPLE 4

In the same manner as in Example 1, 189.4 parts of 2,2'-di-(4-hydroxypropoxyphenyl)propane, 47.7 parts of diethyleneglycol, 177.7 parts of phthalic anhydride and 43.9 parts of adipic acid were placed in a flask and the mixture was maintained at 160° to 200° C. for 3 hours while stirring.

The ester thus obtained, a solid at room temperature, had an acid value of 181 and a number average molecular weight $M_n$ of 910. The ester was neutralized with aqueous ammonia and dissolved in a 2:1 (by volume) mixture of isopropyl alcohol to toluene to obtain a transparentizing composition.

The composition was applied in the same manner as described in Example 1 to produce a transparent paper having an agent-content of 10.2% and an opacity of 59%. The paper had a good sizeability and no migration during storage occurred.

EXAMPLE 5

In the same manner as in Example 1, a mixture of 111.0 parts of phthalic anhydride, 110 parts of adipic acid and 240 parts of hydrogenated bisphenol A was maintained at 160° to 200° C. for 3 hours while stirring to obtain an ester. The ester thus obtained, a pitch-like material at room temperature, had an acid value of 118 and a number average molecular weight $M_n$ of 940.

The ester was neutralized with aqueous ammonia and dissolved in a 1:1 (by volume) mixture of water to isopropyl alcohol to obtain a transparentizing composition. The composition was applied in the same manner as described in Example 1 to produce a transparent paper having an agent-content of 8.9% and an opacity of 62%.

EXAMPLE 6

In the same manner as in Example 1, a mixture of 189.4 parts of 2,2'-di-(4-hydroxypropoxyphenyl)propane, 47.7 parts of diethylene glycol and 178 parts of phthalic anhydride was maintained at 160° to 200° C. for 3 hours while stirring. The ester thus obtained, a pitch-like material at room temperature, had an acid value of 77.0 and a number average molecular weight $M_n$ of 1100.

The ester was neutralized with aqueous ammonia and dissolved in a 1:1 (by volume) mixture of water to isopropyl alcohol to produce a transparentizing composition. The composition was applied in the same manner as described in Example 1 to produce a transparent paper having an agent-content of 11.8% and an opacity of 56%.

EXAMPLE 7

In the same manner as in Example 1, a mixture of 189.4 parts of 2,2'-di-(4-hydroxypropoxyphenyl)propane, 47.7 parts of diethylene glycol and 296.2 parts of phthalic anhydride was maintained at 140° to 160° C. for 2 hours while stirring. The ester thus obtained, a solid at room temperature, had an acid value of 212 and a number average molecular weight $M_n$ of 540. The ester was neutralized with aqueous ammonia to prepare an aqueous solution thereof. The transparentizing composition thus obtained was applied in the same manner as described in Example 1 to produce a transparent paper having an agent-content of 10.5% and an opacity of 61.3%.

EXAMPLE 8

In a 1 liter four-necked flask equipped with a thermometer and Liebig condenser were placed 240 parts of hydrogenated bis-phenol A, 148 parts of phthalic anhydride and 49 parts of maleic anhydride, and the mixture was maintained at 120° to 180° C. on a mantle heater for 3 hours while stirring. The product thus obtained (acid value 190, M.P. 74° C.) was neutralized with 28% aqueous ammonia to obtain the neutralized product which was soluble in water in any proportion.

Paper having a basis weight of about 45 g/m$^2$ and an opacity of 83% was impregnated with the aqueous solution and the excess solution was removed by squeezing the paper between two steel rolls. The treated paper was dried at 130° C. for 2 minutes and then tested. It was found from the test results that the paper had an agent-content of 14% and an opacity of 52%.

EXAMPLE 9

In the same manner as in Example 8, 144 parts of 1,4-cyclohexanedimethanol, 96 parts of trimellitic acid and 154 parts of hexahydrophthalic anhydride were placed in a flask, and the mixture was maintained at 140° to 180° C. for 3 hours while stirring.

The resulting product (acid value 281, M.P. 61° C.) was neutralized with aqueous ammonia to produce an aqueous solution thereof. The treated paper obtained using the solution in the same manner as described in Example 8 and an agent-content of 15% and an opacity of 56%.

EXAMPLE 10

In the same manner as in Example 8, a mixture of 260 parts of 2,2'-di-(4-hydroxypropoxyphenyl)propane, 96 parts of trimellitic acid and 154 parts of hexahydrophthalic anhydride was maintained at 140° to 180° C. for 3 hours while stirring. The resulting product (acid value 217, M.P. 56° C.) was neutralized with aqueous ammonia to produce an aqueous solution thereof. The treated paper obtained using the solution in the same manner as described in Example 8 had an agent-content of 13.5% and an opacity of 56%.

REFERENCE EXAMPLE 1

In the same manner as Example 1, an ester was prepared from 240 parts of hydrogenated bisphenol A, 89.7 parts of hexahydrophthalic anhydride and 207.2 parts of adipic acid. The ester thus obtained, a syrup-like material at room temperature, had an acid value of 212, and a number average molecular weight $M_n$ of 740. The ester was neutralized with aqueous ammonia and dissolved in a 1:1 (by volume) mixture of water to isopropyl alcohol to obtain a resin liquor.

The liquor was applied in the same manner as described in Example 1 to obtain a treated paper having a resin-content of 10.6% and an opacity of 68%. Migration during storage occurred with a poor storage stability.

REFERENCE EXAMPLE 2

In the same manner as in Example 1, an ester was prepared from 40.7 parts of hydrogenated bisphenol A, 88.1 parts of diethylene glycol and 222 parts of phthalic anhydride. The ester thus obtained, a syrup-like material at room temperature, had an acid value of 122 and a number average molecular weight $M_n$ of 780.

The ester was neutralized with aqueous ammonia and dissolved in a 1:1 (by volume) mixture of water to isopropyl alcohol to obtain a resin liquor.

The liquor was applied in the same manner as described in Example 1 to produce a treated paper having a resin-content of 11.7% and an opacity of 70.3%. Migration from the paper to adjacent materials easily occurred during storage with a very poor practical value.

REFERENCE EXAMPLE 3

A resin liquor having a solid content of 43% and a viscosity of 15 cp/25° C. was prepared by mixing the following three components: (1) 33 parts of a 60% solution (viscosity 4.7 poise) of a butoxy-methylol melamine resin (the resin being prepared from melamine, formaldehyde and butanol in a molar ratio of 1:5.5:6) in a 1:1 by volume mixture of toluene to isopropyl alcohol, (2) 80 parts of a non-oil-modified alkyd resin (viscosity 69.0 poise) prepared from adipic acid, trimethylolpropane and ethylene glycol in a molar ratio of 4:3:1, and (3) 137 parts of a 1:1 by volume mixture of toluene to isopropyl alcohol.

In the resin liquor was dissolved 0.4 part of p-toluenesulfonic acid and the resulting liquor was applied in the same manner as described in Example 1 to obtain a treated paper having a resin-content of 12.3% and an opacity of 67.4%. The treated paper, however, was very poor in sizeability and gumming during operation occurred, and therefore was not practical.

The performance of the transparent paper obtained in Examples 1 to 7 and Reference Examples 1 to 3 are summarized in Table 1.

Table 1

| Example | Opacity (%) | Tearing Strength (g) | Ink-Receptivity | Sizing Degree (sec) | Pencil-Receptivity | Processability | Evaluation as Master Paper |
|---|---|---|---|---|---|---|---|
| Untreated paper | 83 | 78.9 | B–C | 0 | C | — | D |
| Example 1 | 51 | 75.2 | A | 89.3 | A | A | A |
| Example 2 | 51.7 | 73.6 | B | 86.0 | A | B | A |
| Example 3 | 54 | 64.5 | A | 76.5 | B | A | A |
| Example 4 | 59 | 77.9 | A–B | 80.2 | B | A | A |
| Example 5 | 62 | 64.5 | B | 77.6 | B | A | B |
| Example 6 | 58 | 73.1 | A | 68.2 | A | A | A |
| Example 7 | 56 | 77.5 | B | 55.1 | A | A | A |
| Reference Example 1 | 68 | 73.6 | B–C | 21.5 | C | C | C–D |
| Reference Example 2 | 70.3 | 67.7 | C | 0 | C | C–D | D |
| Reference Example 3 | 67.4 | 54.6 | C | 12.7 | C | D | D |

A: Very good
B: Good
C: Much difficulty in practical use
D: Not suitable

While the invention has been described in detail and with reference to specific embodiments thereof, it will be apparent to one skilled in the art that various changes and modifications can be made therein without departing from the spirit and scope thereof.

What is claimed is:

1. A transparentizing composition for paper comprising at least member selected from the group consisting of a compound of the formula:

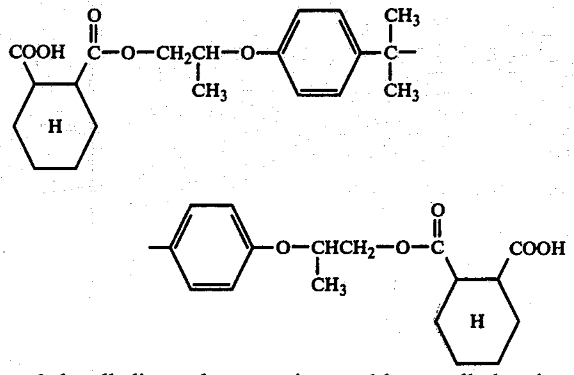

and the alkali metal, ammonium and lower alkyl amine salts thereof; and a solvent selected from the group consisting of water and organic solvents.

2. The transparentizing composition of claim 1, wherein the amount of the compound is about 10 to 70% by weight based on the total weight of the compound and the solvent.

3. The transparentizing composition of claim 1, wherein said organic solvent is methanol, ethanol, isopropanol, acetone, toluene or ethylcellosolve.

* * * * *